US006164403A

United States Patent [19]

Wuidart

[11] Patent Number: 6,164,403

[45] Date of Patent: Dec. 26, 2000

[54] SECURITY SYSTEM

[75] Inventor: Luc Wuidart, Pourrieres, France

[73] Assignee: STMicroelectronics S.A., Gentilly, France

[21] Appl. No.: 09/220,524

[22] Filed: Dec. 23, 1998

[30] Foreign Application Priority Data

Dec. 24, 1997 [FR] France .................................. 97 16467

[51] Int. Cl.[7] .................................................... B60R 25/00

[52] U.S. Cl. ........................................ 180/287; 340/425.5

[58] Field of Search ......................... 180/287; 340/425.5, 340/426, 485.69

[56] References Cited

U.S. PATENT DOCUMENTS

| | | | |
|---|---|---|---|
| 4,151,512 | 4/1979 | Riganati et al. | 340/146.3 |
| 4,663,626 | 5/1987 | Smith | 340/825.69 |
| 4,926,332 | 5/1990 | Komuro et al. | 364/424.05 |
| 5,661,451 | 8/1997 | Pollag | 340/426 |
| 5,729,191 | 3/1998 | Allen et al. | 340/426 |
| 5,818,330 | 10/1998 | Schweiger | 340/426 |
| 5,887,466 | 3/1999 | Yoshizawa | 70/257 |

FOREIGN PATENT DOCUMENTS

| | | |
|---|---|---|
| 01114193 | 5/1989 | Japan . |
| 08270281 | 10/1996 | Japan . |
| WO95/15663 | 6/1995 | WIPO . |

*Primary Examiner*—Kevin Hurley
*Assistant Examiner*—Kevin McKinley
*Attorney, Agent, or Firm*—Theodore E. Galanthay; Stephen C. Bongini; Fleit, Kain, Gibbons, Gutman & Bongini P.L.

[57] ABSTRACT

A security system of the type having a fixed terminal and a portable unit such as a remote control. The portable unit produces an activation signal based on active intervention by a user and a measurement signal based on the measurement of a biometrical signature of the user. A control signal is generated when the activation and measurement signals are both generated within a specified temporal window and the measured biometrical signature corresponds to that of an authorized user. Thus, there is a reduced chance of both the security system being disarmed by an ill-intentioned third party and of untimely or inadvertently disarming the system.

33 Claims, 2 Drawing Sheets

SECURITY SYSTEM

CROSS-REFERENCE TO RELATED APPLICATIONS

This application is based upon and claims priority from prior French Patent Application No. 97-16467, filed Dec. 24, 1997, the entire disclosure of which is herein incorporated by reference.

BACKGROUND OF THE INVENTION

1. Field of the Invention

The present invention relates to security systems, and more specifically to security systems of the type having a fixed terminal and a portable unit that delivers a signal to the fixed terminal.

2. Description of Related Art

A conventional automobile security system is one example of a security system that has a fixed terminal and a portable unit that delivers a lock/unlock signal to the fixed terminal. In the typical automobile security system, the fixed terminal is a device for the centralized locking and unlocking of the vehicle and the portable unit is a remote control for operating the locking and unlocking device. The portable unit is designed to be carried by an authorized user (e.g., the vehicle owner), and under certain conditions delivers the lock/unlock signal to the fixed terminal in order to remotely lock or unlock the doors of the vehicle. (This description uses the term "fixed", for example in designating the locking and unlocking device on the vehicle, in a relative sense and the term should be understood with reference to the portable unit.)

The lock/unlock signal from the portable unit is generally transmitted by a carrier wave such as an electromagnetic or infrared wave, and typically includes a fixed or changing code (i.e., a code whose value depends on the number of previous transmissions). The code must be recognized as valid by the fixed terminal in order for the signal to prompt the locking or unlocking of the doors of the vehicle. While this provides some anti-theft protection, the security level of such a system against theft is still imperfect because the mere physical possession of the portable unit is generally sufficient to effect the unlocking of the vehicle. Thus, if the portable unit is lost or stolen, an ill-intentioned third party can easily use the portable unit to open the doors of the vehicle and then remove articles inside the vehicle or even steal the vehicle.

To overcome this problem, a security system can be associated with its authorized user (or users) so that only an authorized user can unlock the doors of the vehicle. For example, the system can include means for measuring a biometrical signature of an authorized user. With such a means, the security system can use a biometrical signature such as a fingerprint, the iris of the eye, or an audiometrical spectrum of the authorized user's voice to identify or authenticate a physical person. To this end, it has been proposed to use a voice recognition module in the fixed terminal of a security system to control the locking or unlocking of the vehicle upon the sound of the authorized user's voice. In such a system, the portable unit becomes superfluous and can be eliminated to produce a "hands-free" access system.

While such a system would provide some advantages over conventional security systems, there is a risk that the vehicle will be accidentally unlocked. For example, when in the vicinity of the vehicle, the authorized user could inadvertently pronounce a word or sequence of words that prompts the unlocking of the vehicle. If the user does not realize that this has happened, the user may walk away and thus inadvertently leave the vehicle unguarded with its doors unlocked.

SUMMARY OF THE INVENTION

In view of these drawbacks, it is an object of the present invention to remove the above-mentioned drawbacks and to provide a security system of the type associated with an authorized user (or users) that has a reduced chance of an inadvertent or untimely unlocking of the vehicle. The security system includes a fixed terminal and a portable unit that provides the fixed terminal with a signal for locking and unlocking a functional unit (e.g., a vehicle). The portable unit includes a detector, a measurement device, and a signal generator. The detector generates an activation signal when active intervention by a user is detected, and the measurement device measures a biometrical signature of the user. When the activation signal and a measurement signal are produced within a specified temporal window, the signal generator generates the lock/unlock signal if the measured biometrical signature corresponds to that of an authorized user. Because the measurement of a valid biometrical signal is necessary to prompt the portable unit to transmit the lock/unlock signal, an ill-intentioned third party possessing the portable unit cannot use it to unlock the vehicle. Further, because an active intervention by the user is still necessary to transmit the lock/unlock signal, the chance of untimely or inadvertently unlocking the vehicle is significantly reduced or eliminated. The present invention also preserves the function of a remote unit so that the users' current habits do not have to be significantly modified.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
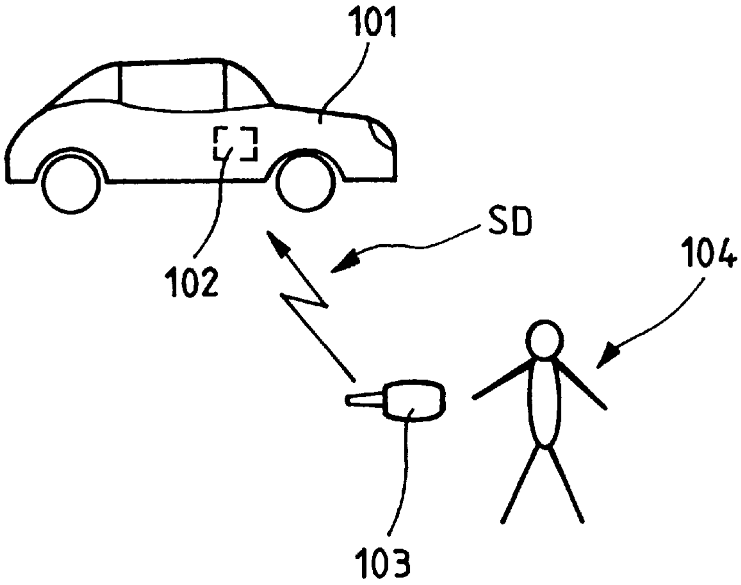
FIG. 1 is a simplified drawing showing a security system for an automobile.

FIG. 1 is a simplified illustration of a security system for an exemplary functional unit in the form of an automobile. The automobile 101 is fitted with an onboard fixed terminal such as a centralized locking and unlocking unit 102. The security system also includes a portable unit 103 such as a "remote" control that is usually associated with a key for the vehicle. (In the following description, the portable unit is identified with the remote control or the key for the vehicle and these three expressions are used without distinction.)

The portable unit is designed to be carried and operated by an authorized user 104 (e.g., the owner of the vehicle), and other authorized users can use the same portable unit 103 or another unit of the same kind that is assigned to them for the same function. Under certain conditions, the portable unit 103 delivers a lock/unlock signal SD to the fixed terminal 102 by means of a carrier wave such as an electromagnetic or infrared wave. In preferred embodiments, the lock/unlock signal SD is an amplitude-modulated or phase-modulated radio frequency signal that is generated by the portable unit.

Figure 2:
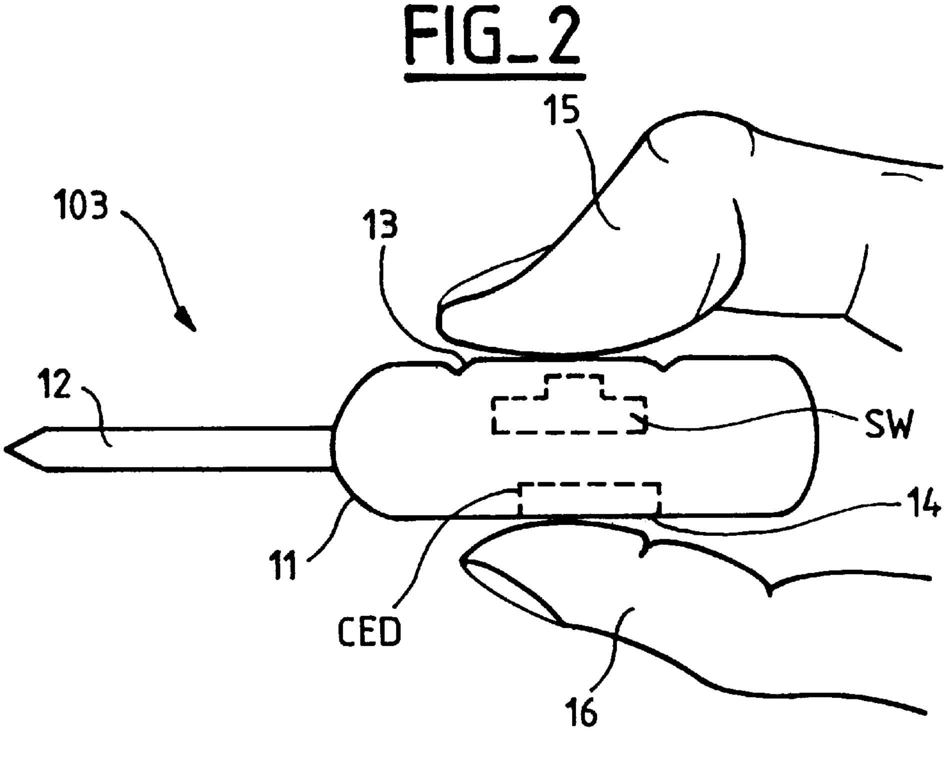
FIG. 2 is a drawing showing a portable unit according to an embodiment of the present invention.

FIG. 2 shows a more detailed view of a portable unit in the form of a key in accordance with an embodiment of the present invention. The key 103 has a conventional metal portion 12 that forms a key insert and an upper portion 11 that forms the head or grasping portion of the key. The upper portion 11 fulfills a remote control function of the system. For this purpose, the upper or remote control portion in the illustrated embodiment is a plastic portion containing an electronic circuit that transmits the lock/unlock signal SD. The remote control portion includes detection means for detecting the active intervention of the user in a known manner. For example, the detection means can include one or more keys of a keyboard, or more simply a switch SW (e.g., a push-button type switch) that is positioned under a first region 13 of the remote control portion 11. The first region 13 of the remote control portion can be folded by pressure exerted by the user's thumb 15 (e.g., because of a smaller thickness or the presence of adjacent ribs) to activate the switch SW within the remote control portion 11.

Additionally, the remote control portion 11 includes measurement means for measuring a biometrical signature of the authorized user of the vehicle. In one embodiment, the measurement means includes a microphone and a voice-recognition device that identify the user's voice. However, in preferred embodiments such as the one shown in FIG. 2, the measurement means includes a fingerprint sensor CED that is located within the remote control portion 11 of the portable unit 103. The active surface of the sensor CED is flush with an outer surface of the plastic portion 11 of the key.

Sensors suitable for such use are currently available in the form of monolithic integrated circuits at prices that are compatible with the market for automobile security systems. Further, these sensors are sufficiently precise, reliable, and compact for such an application. For example, one such sensor is manufactured by STMicroelectronics S.A. (Gentilly, France) under the reference STFP2015-50. This particular sensor has an active surface area of less than 2 $cm^2$ that includes nearly 100,000 detection cells arranged in a matrix. The entire active surface area is scanned eight times per second and serial digital data corresponding to the active surface scanning is delivered.

In the illustrated embodiment of the present invention, the fingerprint sensor CED is positioned beneath a second region 14 of the remote control portion 11 that is opposite the first region 13. This allows the user's index finger 16 to contact the second region 14 containing the sensor while the thumb 15 contacts the first region 13 containing the switch when the plastic portion 11 of the key is clamped between these fingers. In some alternative embodiments, the sensor is positioned on the surface of the plastic portion 11 at the level of the first region 13 so that the user's thumb 15 is applied against the active surface of the sensor while also exerting pressure through the sensor to activate the push-button SW. While two mechanical layouts for the switch and sensor in the portable unit have been described, the present invention is not limited to only these specific structures. The elements of the portable unit can be laid out in any appropriate manner in accordance with design preferences by one of ordinary skill in the art, and thus specific structures are not described in detail.

Figure 3:
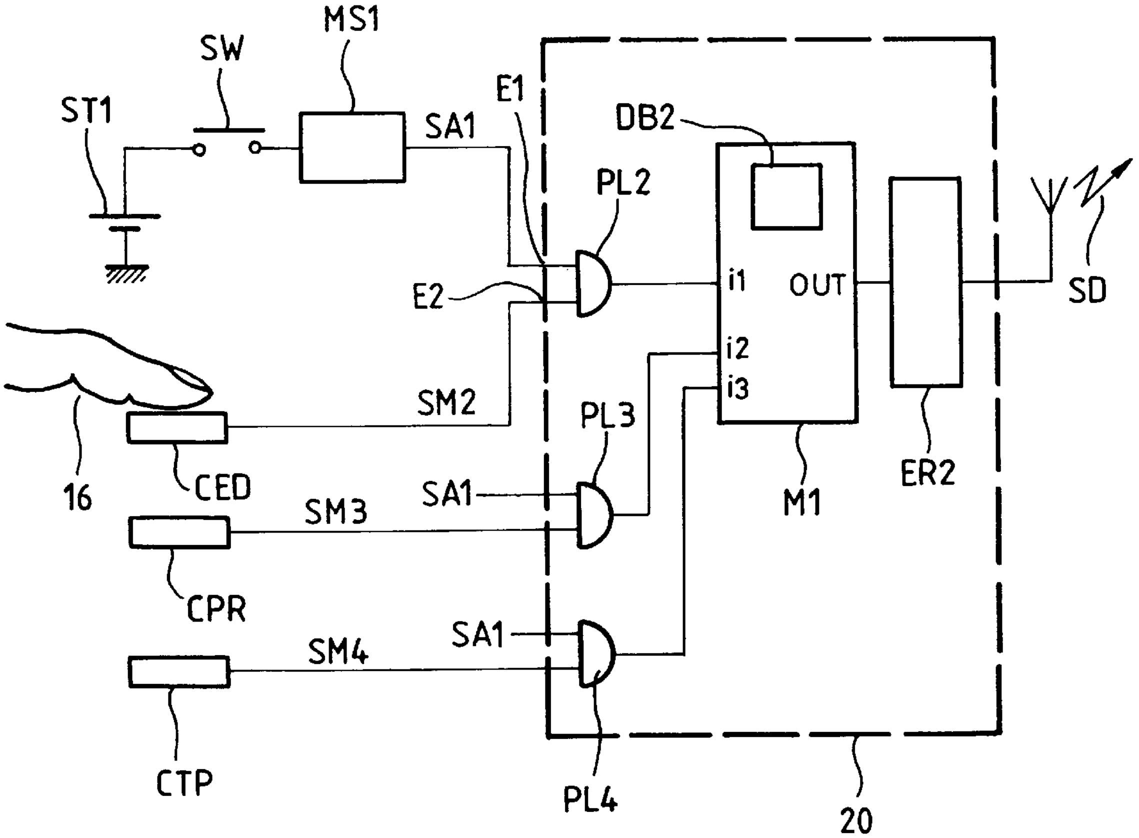
FIG. 3 is a block diagram of a portable unit according to an embodiment of the present invention.

FIG. 3 is a block diagram of a portable unit according to one embodiment of the present invention. As shown, the portable unit includes detection means for detecting active intervention by a user and producing an activation signal SA1. In one embodiment, the detection means is formed by a switch SW that has a first terminal connected to the positive terminal of a voltage source ST1, and a negative supply terminal of the voltage source is connected to ground. The activation signal SA1 is delivered by the second terminal of the switch SW. Thus, the activation signal SA1 is active (e.g., in the "1" state) when the switch SW is closed.

However, in the illustrated embodiment, the detection means includes the switch SW and a timer MS1. The first terminal of the switch SW is similarly connected to the voltage source ST1, but the timer MS1 is connected to the second terminal of the switch and outputs the activation signal SA1. In this embodiment, the timer is a monostable circuit with a time constant T. The timer has the effect of holding the activation signal SA1 in the active state for a specified time, which corresponds to the time constant T, after the closing of the switch SW. Thus, even if the pressure exerted on the switch by the user's thumb is stealthy, the activation signal is kept active for the specified time. This is especially advantageous when the switch is of a stealthy type such as a push-button.

Additionally, the portable unit includes measurement means CED, preferably in the form of a fingerprint sensor, for measuring a biometrical signature of the user and delivering a measurement signal SM2. The portable unit also includes generation means for generating the unlock signal SD when the activation signal SA1 and the measurement signal SM2 are produced within a specified temporal window and the measured biometrical signature corresponds to an authorized user. The generation means is in the form of a control circuit 20 having a first input E1 that receives the activation signal SA1 and a second input E2 that receives the measurement signal SM2 from the sensor CED.

The control circuit 20 also includes a microcontroller M1 that has a memory DB2 in which biometrical signatures of one or more authorized users are stored (e.g., the fingerprint of the thumb, index finger, or any other finger). Preferably, each biometrical signature is stored as a matrix of binary data and the biometrical signatures of each authorized user are stored in distinct areas of the memory DB2 that are referenced by a user number. For example, five distinct areas could be reserved for storing the biometrical signatures of five different authorized users (e.g., the members of a family), with each user being fictitiously associated with a user number (e.g., 1, 2, 3, 4 or 5). It is also preferable to have the fingerprint sensor CED deliver the measurement signal SM2 as a digital signal so that the data supplied to the second input E2 of the control unit 20 can be directly exploited by the microcontroller M1. Otherwise, it is necessary to provide an analog-to-digital converter for the measurement signal.

The microcontroller M1 is driven by a control program. When the data elements of the measurement signal SM2 correspond to the data elements stored in one of the areas of the memory DB2, the microcontroller M1 delivers an output signal OUT. The output signal OUT is then supplied to a transmission circuit ER2 to prompt the transmission of the unlock signal SD, for example through an antenna, infrared diode, or electrical connection. In order to provide a clear illustration of the logical combination of the activation signal SA1 and the measurement signal SM2 within the control unit 20, FIG. 3 shows an AND gate PL2 that receives the activation signal SA1 at one input and the measurement signal SM2 at another input. The output of the AND gate PL2 is supplied to an input i1 of the microcontroller M1.

The AND gate PL2 is shown solely to illustrate one of the conditions that governs the transmission of the unlock signal (i.e., that the activation signal SA1 and the measurement signal SM2 are generated within a specified temporal window). With such a configuration, the measurement signal SM2 from the sensor CED only reaches the microcontroller M1 when the activation signal SA1 is active. However, this representation is not meant to imply any limitations on practical embodiments of the present invention. For example, the two signals SA1 and SM2 could be transmitted to two distinct inputs of the microcontroller M1 in order to be processed by the microcontroller in an AND-type logic operation.

Further, it will be noted that the temporal window during which the activation signal SA1 is kept active must at least be equal to the duration of the transmission through the measurement signal SM2 of the data elements corresponding to a user's fingerprint. It is presently believed that a temporal window of 500 milliseconds is sufficient for this purpose. Additionally, because both the activation signal and the measurement signal must be generated within the specified temporal window in order to generate the lock/unlock signal, problems of order and/or synchronization between the occurrence of these two signals are avoided.

In some embodiments of the present invention, the portable unit also includes other measurement means for measuring biometrical data elements corresponding to the user and generating other measurement signals. Then, the generation means generates the unlock signal SD when the activation signal SA1 and all of the measurement signals SM are produced within the specified temporal window and the measured biometrical signatures correspond to those of an authorized user. For example, a second biometrical data element of the user could be the arterial blood pressure measured at the finger, and a third biometrical data element of the user could be the temperature of the finger.

In the illustrated embodiment, a pressure sensor CPR and a temperature sensor CTP are also provided to measure these biometrical data elements of the user. By taking such additional biometrical data elements of the user into account, it becomes more difficult to fraudulently unlock the vehicle. For example, the illustrated embodiment can thwart an attempt to fraudulently unlock the vehicle by manufacturing an artificial finger (e.g., of latex) that has a faithful reproduction of an authorized user's fingerprint. As shown in FIG. 3, a second AND gate PL3 receives a second measurement signal SM3 from the pressure sensor CPR at one input and the activation signal SA1 at another input. Similarly, a third AND gate PL4 receives a third measurement signal SM4 from the temperature sensor CTP at one input and the activation signal SA1 at another input. The outputs of the second and third AND gates PL3 and PL4 are supplied to second and third inputs i2 and i3 of the microcontroller M1.

In one embodiment of the present invention, the unlock signal SD includes an impersonal code to identify the authorized user whose biometrical signature has been measured and recognized to be valid. The impersonal code can simply be the corresponding user number (e.g., 1, 2, 3, 4, or 5 as described above). By transmitting the impersonal code, selected convenience functions in the vehicle can be activated when the unblock signal SD is received. For example, such functions could include the adjusting of the positions of the seats and the positions of the rearview mirrors, the setting of a selected temperature of the onboard thermostat, the tuning of the radio to a particular station, and so on according to predefined values corresponding to the preferences of one of the users.

In such embodiments, the portable unit transmits an impersonal number such as 1, 2, 3, 4, or 5 that merely identifies one of the authorized users from among the set of authorized users, and not information relating to the user's biometrical signature (hence the expression "impersonal code"). Thus, the data elements pertaining to the authorized user's biometrical signature cannot fall into the hands of an ill-intentioned third party that intercepts the unlock signal SD. Preferably, the unlock signal SD also includes a code for identifying the vehicle associated with the portable unit so that a specified portable unit can be associated with a single vehicle.

The exact structure, features, and operation of the fixed terminal (e.g., a centralized door locking and unlocking unit) are not critical to the present invention and can conform to conventional fixed systems. At the least, the selection and design of the fixed terminal are within the scope of one of ordinary skill in the art so the fixed terminal will not be described in greater detail. Furthermore, the lock/unlock signal can also include a standard type of open-ended code (i.e., a code whose value changes with each transmission). Such a code can be used to hinder fraudulent attempts at picking up and recording (with appropriate electronics) the lock/unlock signal when it is normally transmitted by an authorized user and then subsequently and fraudulently reproducing the signal to unlock the vehicle.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A security system of the type having a fixed terminal and a portable unit that delivers a control signal to the fixed terminal, the portable unit comprising:

detection means for detecting active intervention by a user and generating an activation signal;

measurement means for measuring a biometrical signature of the user and generating a first measurement signal; and generation means for generating the control signal when:

at least the activation signal and the first measurement signal are generated within a specified temporal window, and the measured biometrical signature corresponds to the biometrical signature of an authorized user, wherein the detection means and the measurement means are positioned such that a single holding position of the portable unit by the user enables both the user to produce the active intervention and the measurement means to measure the biometrical signature of the user.

2. The security system as defined in claim 1, wherein the fixed terminal is attached to a vehicle and the control signal is a lock/unlock signal that causes the fixed terminal to lock and unlock the vehicle.

3. The security system as defined in claim 1, wherein the detection means includes a push-button switch.

4. The security system as defined in claim 1, wherein the measurement means includes a digital fingerprint sensor.

5. The security system as defined in claim 1, wherein the generation means includes:

a first input receiving the activation signal;

a second input receiving the first measurement signal; and a microcontroller coupled to the first and second inputs, the microcontroller having a memory that stores biometrical signatures for one or more authorized users.

6. The security system as defined in claim 1, wherein the portable unit further comprises at least one other measurement means for measuring a biometrical data element of the user and generating another measurement signal, and the generation means generates the control signal when:

all of the measurement signals are generated within the specified temporal window, and the measured biometrical signature corresponds to the biometrical signature of an authorized user.

7. The security system as defined in claim 1, wherein the control signal includes an impersonal code that identifies which authorized user's biometrical signature was measured, the impersonal code being automatically selected by the generation means from a plurality of impersonal codes based on the biometrical signature that was measured.

8. The security system as defined in claim 1, wherein the detection means detects active intervention on one face of the portable unit, and the measurement means measures the biometrical signature present on an opposite face of the portable unit.

9. The security system as defined in claim 1, wherein the detection means detects active intervention on a face of the portable unit, and the measurement means measures the biometrical signature present on the same face of the portable unit.

10. The security system as defined in claim 3, wherein the detection means further includes a timer that holds the activation signal in an active state for a predetermined period after activation of the switch.

11. The security system as defined in claim 10, wherein the predetermined period is at least as long as the specified temporal window.

12. The security system as defined in claim 5, wherein the generation means further includes a transmission circuit coupled to the microcontroller, the transmission circuit transmitting the control signal.

13. The security system as defined in claim 5, wherein the memory has distinct areas reserved for storing the biometrical signatures of different authorized users.

14. The security system as defined in claim 6, wherein one of the other measurement means includes a pressure sensor.

15. The security system as defined in claim 6, wherein one of the other measurement means includes a temperature sensor.

16. The security system as defined in claim 7, wherein the fixed terminal activates convenience functions based on the impersonal code.

17. A control unit for controlling a security system, said control unit comprising:

a detection circuit for generating an activation signal when active intervention by a user is detected;

a measurement circuit for measuring a biometrical signature of the user, the measurement circuit generating a measurement signal when the measured biometrical signature corresponds to the biometrical signature of an authorized user; and a signal generation circuit for generating a control signal when at least the activation signal and the measurement signal are generated within a specified temporal window, wherein the detection circuit and the measurement circuit are positioned on the control unit such that a single holding position of the control unit by the user enables both the user to produce the active intervention and the measurement circuit to measure the biometrical signature of the user.

18. The control unit as defined in claim 17, wherein the control signal prompts at least the disarming of the security system.

19. The control unit as defined in claim 17, wherein the security system includes a unit that is attached to a vehicle and the control signal causes the attached unit to lock and unlock the vehicle.

20. The control unit as defined in claim 17, wherein the detection means includes a switch and a timing circuit that holds the activation signal in an active state for a predetermined period after activation of the switch.

21. The control unit as defined in claim 17, wherein the measurement means includes at least one of a fingerprint sensor, a pressure sensor, and a temperature sensor.

22. The control unit as defined in claim 17, wherein the generation means includes a microcontroller coupled to the activation signal and the measurement signal, the microcontroller having a memory that stores at least one biometrical signature for at least one authorized user.

23. The control unit as defined in claim 17, wherein the measurement circuit includes a plurality of biometrical measuring circuits for measuring a plurality of biometrical data elements of the user, the measurement circuit generating the measurement signal when all of the measured biometrical data elements correspond to the biometrical data elements of an authorized user.

24. A method of controlling the disarming of a security system, said method comprising the steps of:

detecting active intervention by a user;

measuring a biometrical signature of the user; and disarming the security system when within a specified temporal window, both active intervention is detected and a biometrical signature corresponding to the biometrical signature of an authorized user is measured, wherein the biometrical signature of the user is measured while the user produces the active intervention that is detected.

25. The method as defined in claim 24, wherein the disarming step includes the sub-steps of:

generating a control signal for disarming the security system; and unlocking a vehicle containing the security system.

26. The method as defined in claim 24, wherein the measuring step includes measuring at least one of a fingerprint, a pressure, and a temperature.

27. The method as defined in claim 24, further comprising the step of storing biometrical signatures for a plurality of authorized users.

28. The method as defined in claim 24, wherein the measurement step includes measuring a plurality of biometrical data elements of the user, and in the disarming step, the security system is disarmed when within a specified temporal window, both active intervention is detected and biometrical data elements that all correspond to the biometrical data elements of an authorized user are measured.

29. The method as defined in claim 25, wherein the control signal includes an impersonal code that identifies which authorized user's biometrical signature was measured, the impersonal code being automatically selected from a plurality of impersonal codes based on the biometrical signature that was measured.

30. The security system as defined in claim 8, wherein when the face and the opposite face are gripped between two digits of the user, the detection means detects the active intervention on the face and the measurement means measures the biometrical signature of the digit on the opposite face.

31. The security system as defined in claim 8, wherein the portable unit is in the form of a key, and the one face and the opposite face are opposite sides of the grasping portion of the key.

32. The security system as defined in claim 9, wherein the user uses a digit to apply force to the face to cause both the detection means to detect the active intervention on the face and the measurement means to measure the biometrical signature of the digit on the same face.

33. A security system of the type having a fixed terminal and a portable unit that delivers a control signal to the fixed terminal, the portable unit comprising:

detection means for detecting active intervention by a user and generating an activation signal;

measurement means for measuring a biometrical signature of the user and generating a first measurement signal; and generation means for generating the control signal when:

at least the activation signal and the first measurement signal are generated within a specified temporal window, and the measured biometrical signature corresponds to the biometrical signature of an authorized user, wherein the biometrical signature of the user is measured by the measurement means while the user produces the active intervention that is detected by the detection means.

* * * * *